United States Patent
Gao et al.

(10) Patent No.: US 9,113,141 B2
(45) Date of Patent: Aug. 18, 2015

(54) WIRELESS CHANNEL AWARE ADAPTIVE VIDEO BIT RATE ENCODING

(75) Inventors: Jie Gao, Sunnyvale, CA (US); Xintian E. Lin, Palo Alto, CA (US); Babu P. Lukose, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 12/928,333

(22) Filed: Dec. 9, 2010

(65) Prior Publication Data

US 2012/0147946 A1    Jun. 14, 2012

(51) Int. Cl.

| | | |
|---|---|---|
| *H04N 19/146* | (2014.01) |
| *H04N 19/115* | (2014.01) |
| *H04N 19/164* | (2014.01) |
| *H04N 19/184* | (2014.01) |

(52) U.S. Cl.
CPC ....... *H04N 19/00169* (2013.01); *H04N 19/115* (2014.11); *H04N 19/146* (2014.11); *H04N 19/164* (2014.11); *H04N 19/184* (2014.11)

(58) Field of Classification Search
CPC . H04N 7/50; H04N 7/26244; H04N 7/26271; H04N 7/26053; H04N 7/26941
See application file for complete search history.

(56) References Cited

U.S. PATENT DOCUMENTS

| | | | |
|---|---|---|---|
| 2003/0169813 A1* | 9/2003 | Van Der Schaar | 375/240.12 |
| 2006/0109915 A1 | 5/2006 | Unger | |
| 2009/0196343 A1 | 8/2009 | Cho et al. | |
| 2010/0262712 A1 | 10/2010 | Kim et al. | |
| 2010/0322302 A1* | 12/2010 | Rodriguez et al. | 375/240.01 |
| 2011/0047283 A1* | 2/2011 | Labonte et al. | 709/231 |
| 2011/0142125 A1* | 6/2011 | Tripathi et al. | 375/240.03 |
| 2011/0228845 A1* | 9/2011 | Banerjee | 375/240.07 |

FOREIGN PATENT DOCUMENTS

WO    2012/078329 A1    6/2012

OTHER PUBLICATIONS

International Search Report and Written Opinion received for PCT Patent Application No. PCT/US2011/061094, mailed on May 24, 2012, 9 pages.
International Preliminary Report on Patentability and Written opinion received for PCT Application No. PCT/US2011/061094, mailed on Jun. 20, 2013, 6 pages.

* cited by examiner

*Primary Examiner* — Dave Czekaj
*Assistant Examiner* — Nam Pham
(74) *Attorney, Agent, or Firm* — James S. Finn

(57) ABSTRACT

A determination and query is performed on wireless channel on which video data is transmitted from a transmitting wireless display or WiDi device. Based on a channel capacity and implementing an algorithm, the encoding bit rate at the transmitting WiDi device. is adaptively adjusted based on the determined channel capacity.

19 Claims, 5 Drawing Sheets

WIRELESS CHANNEL AWARE ADAPTIVE VIDEO BIT RATE ENCODING

BACKGROUND

Wireless Display or WiDi allows a device to transmit data such as encoded video over a wireless channel to a receiving device. An example of the use of WiDi is transmission of video from a personal computer (PC) to a large screen high definition television (HDTV). Another example may be video conferencing devices. In the example of a PC to HDTV, the PC's display or screen data is captured and encoded. The encoded data is transmitted over a wireless channel via a wireless transmitted, to a WiDi adapter connected to or included with the HDTV. The wireless transmission can be performed over wireless fidelity or WiFi, such as one of several versions of the IEEE 802.11 standard. The received encoded video data is decoded and displayed at the HDTV. Typically WiDi implements a fixed rate video encoding and transmission independent of the wireless channel condition or capacity.

Since the encoded video data is transmitted over a wireless channel, video quality is dependent on the wireless channel condition. The wireless channel condition can change due to several reasons, including surrounding interference, noise, distance between transmitter and receiver, other WiFi devices, etc. If the wireless channel condition degrades, the capacity of the wireless channel may not be able to support the transmitted data rate, and video quality can be deteriorated due to the increasing lost packets or lengthy packets retransmission.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

In a wireless display or WiDi transmitting device, that includes a video encoder and WiFi transmitter module, a calculation is performed using an algorithm or procedure that determines wireless channel capacity and adjusts data encoding to allow error-free data transmission with existing wireless channel capacity.

In an implementation, wireless or WiFi channel capacity is acquired, at video group of pictures or GOP level, and the video encoding or bit rate is adaptively changed according to the wireless channel condition as measured by channel capacity. The methods and techniques described can be implemented as part of the video encoder, and other devices/modules of the WiDi transmitting device. The terms video encoding rate and video bit rate are interchangeable as used throughout the description, and define the same term.

In addition, implementations use an algorithm to determine how the video encoding or bit rate can be changed according to current and previous channel capacity values. Such an algorithm can allow the video bit rate to gradually and cautiously increase according to channel capacity and falling rapidly to a value below capacity. A higher bound on the video bit rate can be set according to objective video scores due to the reason that video quality saturates at such high rate and which users may not be able to differentiate. Setting a higher bound can also bring extra margin to address possible wireless channel defects.

Therefore, implementations can make use of the adaptive feature to automatically reduce the video bit rate when a wireless channel is not good enough to support the encoded bit stream. When a wireless channel is able to support high data rate, video can be encoded with a high resolution. If channel is noisy and can support lower data rate, video can be encoded with at a lower resolution.

Example Channel Capacity Situations

Figure 1:
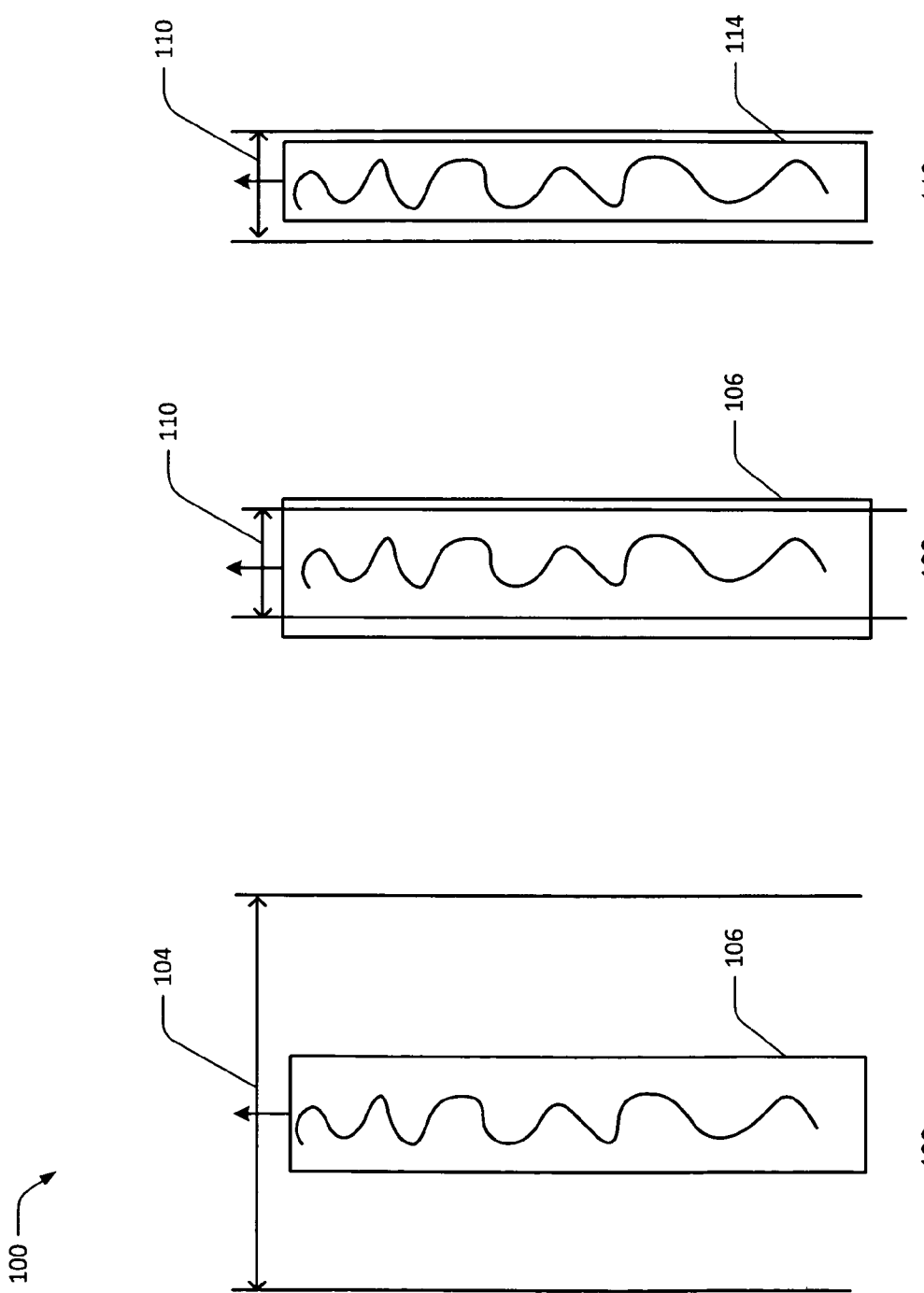
FIG. 1 is a block diagram of example channel capacities and encoded bit streams according to some implementations.

FIG. 1 shows examples 100 of channel capacities and encoded streams 100. In example 102, a wireless (e.g., WiFi) channel has a wireless channel capacity 104. In example 102, the wireless channel capacity has a relatively high signal to noise ratio (SNR) and is considered to be a wide channel. For example, the wireless channel capacity 104 can be 32 Mbps. An encoded data or video stream 106 sent through the wireless channel in this example, may have an encoded rate (i.e., video traffic load) of 8 Mbps. Therefore, for example 102, the channel capacity 104 easily supports the video stream 106.

Example 108, illustrates the same video stream 106 having the same encoded rate or video traffic load of 8 Mbps. However, in example 108, for whatever reasons, such as relatively low SNR or co-ex with other WiFi radio devices, the wireless channel capacity 110 is decreased. In example 108, the wireless channel capacity 110 may be 6 Mbps. The result is that the wireless channel 110 cannot support video stream 106, which leads, to dropped video and other errors as described above.

Therefore, in an implementation, video encoding and transmission is reduced to account for the change in wireless channel capacity. Example 112 shows wireless channel capacity 110 with a relatively low SNR, with a channel capacity of 6 Mbps. In example 112, the video is adaptively encoded to an encoded rate or video traffic load that can pass through wireless channel capacity 110. The adaptive encoded rate or video traffic load 114 is adaptively encoded at 5 Mbps, which is less than capacity of 6 Mbps of wireless channel capacity 110. Therefore, the encoded video stream can pass through the wireless channel with low channel capacity.

Example Wireless Display Device and System

Figure 2:
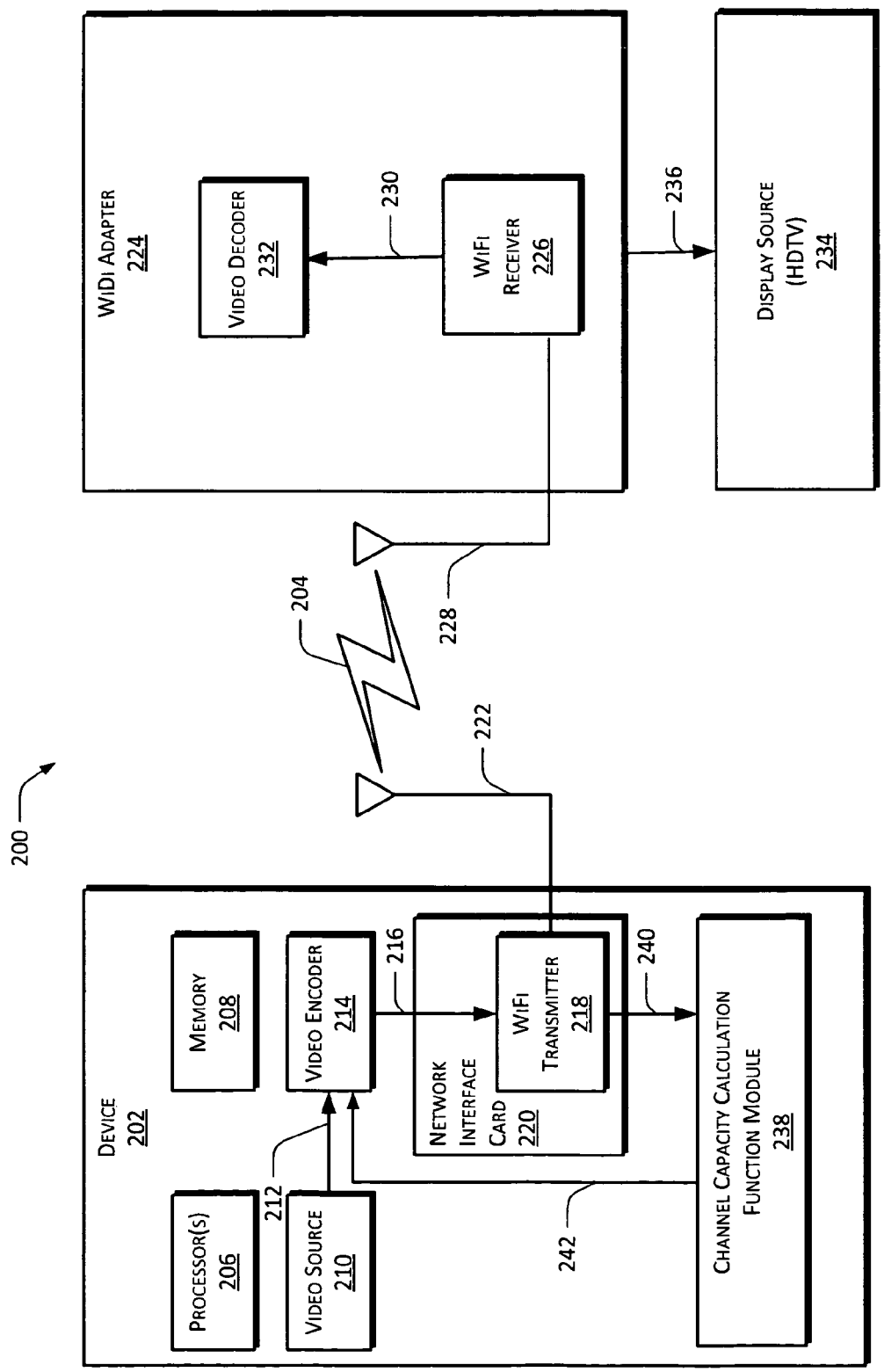
FIG. 2 is a block diagram of an example wireless display or WiDi system according to some implementations.

FIG. 2 shows an example wireless display or WiDi system 200. The WiDi system 200 includes a device 202 that adjusts data or video encoding rate based on capacity of a wireless communication channel 204. The device 202 can include laptops/notebooks, net books, personal digital assistants (PDAs), e-readers, smart phones, video conferencing devices, etc. In general, device 202 includes devices that transmit video (data) over wireless communication channel 204. Wireless communication channel 204 can be implemented, for example, as a WiFi channel that makes use of one or more of the various versions of IEEE 802.11.

Device 202 includes one or more processors 206 and memory 208. In certain implementations, the components and devices that are described can be implemented as part of memory 208. Memory 208 can include computer-readable media includes computer-readable media, which includes computer storage media.

Computer storage media includes volatile and non-volatile, removable and non-removable media implemented in any method or technology for storage of information such as computer readable instructions, data structures, program modules, or other data. Memory 208 and computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

In this example, device 202 includes a video source 210. The video source can include a screen (real or virtual) that receives video. Furthermore, video source 210 can receive video data from other sources, such as a DVD/Blu-Ray player. The video source 210 provides uncompressed/non-encoded video or data via line 212 to a video encoder 214. The encoded video stream can be grouped as particular Group of Pictures or GOPs, as further described below. The video encoder 214 is configured to adjust data or video bit rate per channel capacity of wireless communication channel 204, as further described below.

Encoded video stream is provided via line 216 to a WiFi transmitter module or WiFi transmitter 218. In this example, the WiFi transmitter 218 is part of a network interface card or NIC 220. The WiFi transmitter 218 is connected to an antenna (e) 222 for transmission over wireless channel 204. The transmitted video stream over wireless channel 204 is received by a WiDi adapter (or device) 224. In particular, WiDi adapter 224 includes a WiFi receiver 226 and an antenna(e) 228 to receive the transmitted video stream over wireless channel 204. The received transmitted video stream is passed from WiFi receiver 226 via line 230 to video decoder 232. The encoding at video encoder 214 and decoding at video decoder 232 may be performed using various known encoding/decoding techniques. Decoded video can be sent to a display source 234, such as a high definition television (HDTV). The decoded video can be sent via line 236, where line 236 can be a high definition multimedia interface (HDMI) connection.

In order to adaptively Calculate video bit rate based on capacity of wireless communication channel 204, the device 202 includes a channel capacity calculation function module 238. In an implementation, while WiDi is operating, the WiFi transmitter 218 provides information of video data or packets to channel capacity calculation function module 238 via line 240. Packet information received by channel capacity calculation function module 238, can include physical data rate, number of passing packets, number of failing packets, etc.

An algorithm is implemented, as described below to determine how the video bit rate is changed according to the current and previous channel capacity values. The encoding rate changes are provided back to video encoder 214 via line 242.

The algorithm allows the video rate to gradually and cautiously increase one Mbps at a time if the difference between channel capacity and current video bit rate is larger than a predetermined threshold value. The threshold value avoids changing encoding rate too frequently. Therefore, video encoding rate is adapted to relatively long term channel loss/gain due to interference instead of short term fading.

Furthermore, the described algorithm can also rapidly decrease the video encoding rate, to a value below capacity if the current and last capacity values are less than the current and last video bit rate, respectively. When the wireless channel capacity is increased, video is compressed less and the video quality received by end user is better. On the other hand, if channel is noisy and capacity is decreased, video is compressed more. However the encoded video data is sent through the wireless channel without loss, and overall the received video quality can be better.

Updating Based on Group of Pictures

Figure 3:
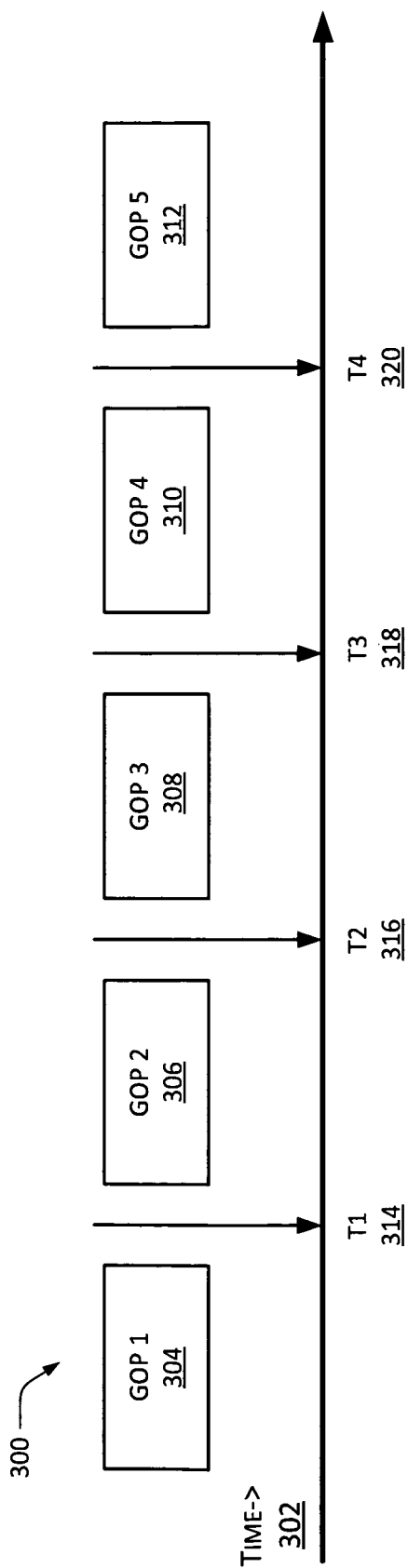
FIG. 3 is a block diagram of an example stream that includes group of pictures or GOPs, where a channel capacity query is performed according to some implementations.

Frames in a video stream can be grouped in as part of a "Group of Pictures" or GOP format. For example, there can be 15 frames for a GOP. In an implementation, query and video encoding changes can take place based on GOP. FIG. 3 shows a video stream 300 that follows a timeline 302. The video stream 300 includes GOP 1 304, GOP 2 306, GOP 3 308, GOP 4 310, and GOP 5 312. In an implementation, the algorithm described below performs on the GOP level.

In certain WiDi implementations, video can be captured and encoded at 30 frames per second. The GOP size is 15 frames, which includes one I (information) frame followed by 14 P (picture) frames. Each GOP lasts half a second. Adaptive video encoder at GOP level can be implemented in order to be less disruptive in the running video and to preserve video smoothness while changing video encoding rate.

After GOP 1 304, at time T1 314, the algorithm further described below performs a channel capacity query, which is the beginning of GOP 2 306. The query is stopped at T2 316 and channel capacity is obtained. If the changing rate criterion is satisfied, the algorithm can initiate rate adaptation activity and choose a rate according to channel capacity. In order to not disrupt the video streaming process, the next capacity query starts one GOP later, i.e. starts at T3 318 and ends at T4 320. With such method, the capacity is updated every 2 GOPs (i.e., 1 second) and the video, bit rate can adapt to the channel condition in a reasonable speed.

In another implementation, the start and stop query inside can be implemented in a WiFi driver, updating capacity value every half a second automatically. In particular, implementations provide for the video encoder 214 to query the capacity at the beginning of each GOP and thus the video encoding rate can adapt to channel condition every GOP (i.e., 500 ms). It is also feasible to reduce the GOP size and thus increase the speed of channel aware video bit rate adaptation.

Video Bit Rate Algorithm

The described algorithm can be used to determine how the video encoding rate should be changed according to the current and previous channel capacity values. The algorithm can allow the video bit rate to gradually and cautiously increase according to channel capacity, and allow the video bit rate to fall rapidly to a value below capacity. A higher bound on the video bit rate can be set according to objective video scores due to the reason that video quality saturates at relatively high rate and end users typically are not able to differentiate such rate changes. Setting a higher bound can also bring extra margin to address any possible wireless channel defects.

Figure 4:
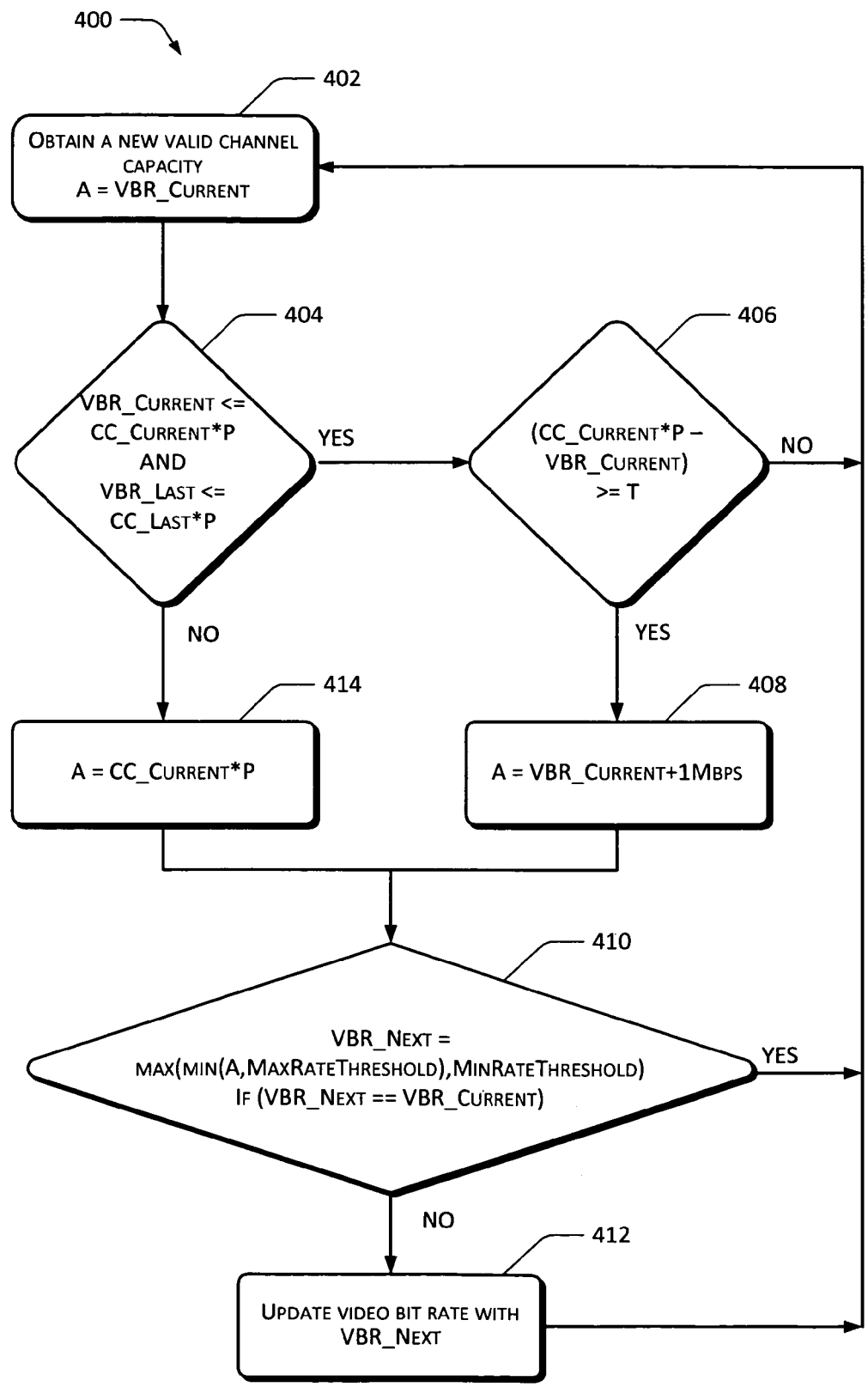
FIG. 4 is a flow diagram of an algorithm for adaptive video bit rate according to some implementations.

FIG. 4 is a flow chart diagram 400 for an exemplary procedure or algorithm to adaptively change video bit rates of a WiDi transmitting device. The flow chart diagram and the described procedure or algorithm can be implemented for example as part of device 202, and in particular by video encoder 214.

The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

The following terms are defined. The variable "A" is a temporary variable, acting as a place holder in the flow chart diagram 400. The term "VBR_Current" represents current video bit rate. The term "VBR_Last" represents last obtained video bit rate. The term "CC_Current" represents current received channel capacity values. The term "CC_Last" represents last received channel capacity value. The term "P" is a predefined percentage that is used to leave some margin between the actual video bit rate and achievable channel capacity. An example value of "P" is 70%. The term "MaxRateThreshold" is an upper-bound of the video bit rate. It is set according to the objective video scores due to the reason that video quality saturates at such high rate which normal users cannot differentiate. Setting a higher bound can also bring extra margin to combat any possible wireless channel defects. The term "MinRateThreshold" is the lower-bound of the video bit rate to guard against certain scenarios when the channel capacity is reduced to an extreme low value due to an instantaneous fading or interference. The term "T" is a threshold to avoid changing bit rate too frequently. Video bit rate may only be adapted to relatively long term channel loss/gain due to interference instead of short term fading impact.

In general, when a new valid channel capacity is obtained, the algorithm checks if the video bit rate should be reduced to a value below the capacity. If not, the algorithm starts checking if the capacity is higher than the current video bit rate and video bit rate needs to be increased. With such an algorithm, the video bit rate can be gradually and cautiously increased to the optimum rate and decreased rapidly to a value below capacity At block 402, a valid channel capacity is determined or obtained. As discussed above, this can be performed based on GOP or selective groupings of frames, or a time wise basis. The temporary variable "A' is set current video bit rate or VBR_Current.

If the condition VBR_Current≤CC_Current*P AND VBR_Last≤CC_Last*P, is met, then following the YES branch of block 404, video bit rate is gradually increased. If the condition (CC_Current*P−VBR_Current)≥T is not met, following the NO branch of block 406, then the flow 400 goes back to block 402. If the condition (CC_Current*P−VBR_Current)≥T is met, following the YES branch of block 406, then:

At block 408, A is set to A=VBR_Current+1 Mbps, gradually increasing the increasing the current video bit rate by 1 Mbps.

If the condition VBR_Next=max(min(A,MaxRateThreshold),MinRateThreshold), If (VBR_Next=VBR_Current) is met, the following the YES branch of block 410, the flow 400 goes back to block 402. If the condition is not met, then At block 412, the video bit rate is updated with the value of VBR_Next, and the flow 400 goes back to block 402.

If the condition VBR_Current≤CC_Current*P AND VBR_Last≤CC_Last*P, is not met, then following the NO branch of block 404, video bit rate is decreased.

At block 414, A is set to A=CC_Current*P, decreasing the current channel capacity by the predefined percentage P. A determination is made as to the condition at block 410.

Adaptive Video Bite Rate Process

Figure 5:
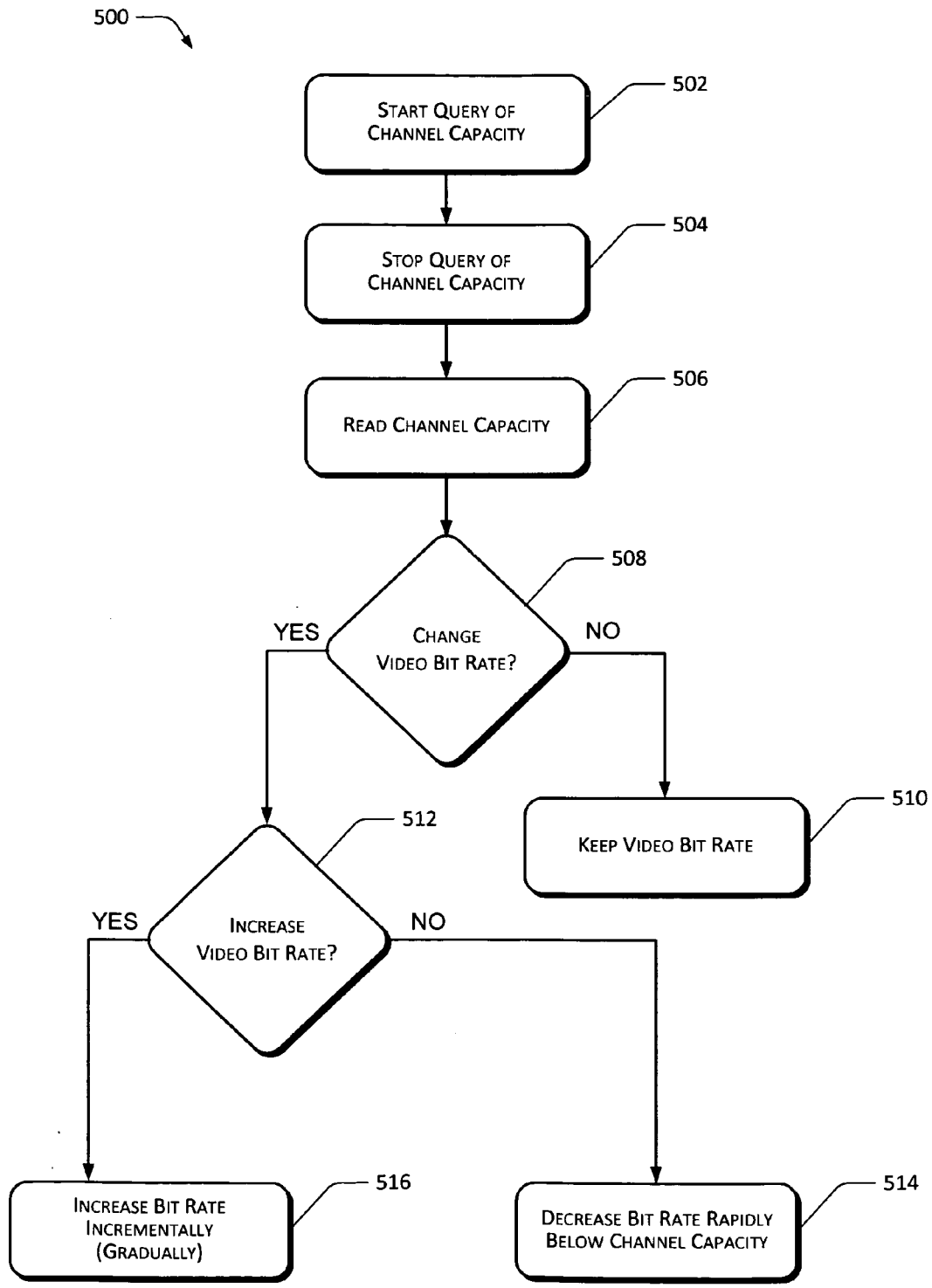
FIG. 5 is a flow diagram for performing adaptive video bit rate based on wireless channel capacity according to some implementations.

FIG. 5 is a flow chart diagram 500 for an exemplary process adaptive video bit rate based on wireless channel capacity. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 502, current or existing wireless channel capacity is queried. The querying can be performed at a wireless transmitter as described above. The querying can be based on a set of video frames, such as a group of pictures as described above.

At block 504, the query of the wireless channel capacity is stopped. The action of block 502 and block 502, i.e., the start and stop of the query of the wireless channel capacity can be based on a set of frames (including a single frame), such as a GOP, or the querying can be based on a set time as described above.

At block 506, the wireless channel capacity is read or determined. As discussed, the determined or read value can be per a set of frames (e.g., GOP) or a set time.

If it is determined, that the video bit rate at which video encoding is occurring is adequate for the capacity of the wireless channel, following the NO branch of block 508, then at block 510 the existing video bit rate is kept. The algorithm as described above in reference to FIG. 4 may be used in determining if video bit rate should change (i.e., block 508), and in the subsequent blocks described below. The changing of the video bit rate may also implement a threshold "T" as described above in FIG. 4, to avoid changing the video bit rate too frequently.

If video bit rate for encoding should change, and if video bit rate for encoding should be decreased, following the NO branch of block 512, at block 514, the video bit rate for encoding is decreased rapidly below the channel capacity. As described above, in the algorithm of FIG. 4, a predetermined percentage can be multiplied with the determined wireless channel capacity to arrive at the new video bit rate.

If the video bit rate for encoding should be increased, following the YES branch of block 512, at block 516, the current video bit rate for encoding is incrementally increased. The incremental or gradual increase can be a predetermined number or percentage of the current bit rate. This incremental increase is added to the current video bit rate for encoding.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as communication devices, computing devices, and other electronic devices.

What is claimed is:

1. A method of adaptively changing encoding bit rate at a transmitting device comprising:
    querying capacity of a wireless WiFi channel that makes use of one or more of versions of IEEE 802.11;

wherein the transmitting device is operable to transmit to a receiver in a wireless display (WiDi) system;
determining whether to change a current encoding bit rate based on the capacity of the wireless WiFi channel;
wherein the determining is based on a MaxRateThreshold which is an upperbound of a video bit rate and a MinRateThreshold which is a lower-bound of the video bit rate;
wherein the video bit rate for encoding is adapted to gradually increase if the difference between channel capacity and current video bit rate is larger than a predetermined threshold value;
wherein the video bit rate for encoding is adapted to decrease to a value below channel capacity if the current and last capacity value are less than the current and last video bit rate; and
adjusting the current encoding bit rate based on the determining.

2. The method of claim 1, wherein querying is based on a number of frames of the video stream.

3. The method of claim 2, wherein the number of frames is the group of pictures.

4. The method of claim 1, wherein the querying is based on a set time.

5. The method of claim 1, wherein the determining includes setting a higher bound for the encoding bit rate.

6. The method of claim 1, wherein the adjusting includes a threshold value for changing encoding bit rate.

7. The method of claim 1, wherein the adjusting accounts for a lower minimum and maximum encoding bit rate.

8. The method of claim 1, wherein the adjusting provides for an incremental increase of encoding bit rate based on a predetermined number.

9. The method of claim 1, wherein the adjusting provides for a rapid decrease of the encoding bit rate based on a predetermined percentage of channel capacity.

10. A transmitting device comprising:
one or more processors;
memory coupled to the one or more processors;
a video encoder coupled to the one or more processors, configured to receive and then encode a video stream;
a wireless transmitter operable using a wireless WiFi channel that makes use of one or more of versions of IEEE 802.11 that receives encoded video data from the video encoder and is configured to operate to transmit to a receiver in a wireless display (WiDi) system, the wireless transmitter is further configured to query capacity of the wireless WiFi channel in which the wireless transmitter is configured to send encoded video streams to determine whether to change a current encoding bit rate based on the capacity of the wireless channel;
wherein the determining is based on a MaxRateThreshold which is an upper-bound of a video bit rate and a MinRateThreshold which is a lower-bound of the video bit rate;
wherein the video bit rate for encoding is adapted to gradually increase if the difference between channel capacity and current video bit rate is larger than a predetermined threshold value; and
wherein the video bit rate for encoding is adapted to decrease to a value below channel capacity if the current and last capacity value are less than the current and last video bit rate.

11. The transmitting device of claim 10, wherein the video encoder adjusts the bit rate based on a threshold value to avoid changing video rate too frequently.

12. The transmitting device of claim 10, wherein the video encoder adjusts the bit rate based on a maximum and a minimum bit rate.

13. The transmitting device of claim 10, wherein the video encoder adjusts the bit rate by an incremental value, if the bit rate is increased.

14. The transmitting device of claim 10, wherein the video encoder adjusts the bit rate by a predetermined percentage, if the bit rate is decreased.

15. The transmitting device of claim 10, wherein the wireless transmitter performs the query based on one of: the group of pictures or time.

16. The transmitting device of claim 10 further comprising a calculation capacity function module to determine an adjusted encoding bit rate.

17. One or more non-transitory processor-readable medium having encoded thereon computer-executable instructions that, when executed by one or more processors, direct a performance of operations, the operations comprising:
querying capacity of a wireless WiFi channel that makes use of one or more of versions of IEEE 802.11; determining a channel capacity of a wireless channel in which video streams are transmitted;
wherein the determining is based on a MaxRateThreshold which is an upper-bound of a video bit rate and a MinRateThreshold which is a lower-bound of the video bit rate;
adjusting encoding bit rate of the video streams based on the determined channel capacity;
wherein the video bit rate for encoding is adapted to gradually increase if the difference between channel capacity and current video bit rate is larger than a predetermined threshold value; and
wherein the video bit rate for encoding is adapted to decrease to a value below channel capacity if the current and last capacity value are less than the current and last video bit rate; and
controlling a transmitting device operable to transmit to a receiver in a wireless display (WiDi) system to transmit the video streams at the adjusted encoding bit rate.

18. The one or more processor readable medium of claim 17, wherein the determining accounts for one or more of the following: maximum bit rate encoding value, minimum bit rate encoding value, threshold to adjust bit rate.

19. The one or more processor readable medium of claim 17, wherein the steps are performed based on the group of pictures or time.

* * * * *